(12) United States Patent
Chang

(10) Patent No.: US 8,746,990 B2
(45) Date of Patent: Jun. 10, 2014

(54) UNIVERSAL MODULAR CONNECTOR

(76) Inventor: Nai-Chien Chang, New Taipei (TW)

( * ) Notice: Subject to any disclaimer, the term of this patent is extended or adjusted under 35 U.S.C. 154(b) by 128 days.

(21) Appl. No.: 13/444,747

(22) Filed: Apr. 11, 2012

(65) Prior Publication Data

US 2013/0022320 A1    Jan. 24, 2013

(30) Foreign Application Priority Data

Jul. 22, 2011   (TW) .............................. 100213601 U

(51) Int. Cl.
   *G02B 6/36* (2006.01)

(52) U.S. Cl.
   USPC ................................ 385/92; 385/88; 438/676

(58) Field of Classification Search
   USPC ................ 385/88–92; 439/676, 541, 625, 65, 439/620.22, 5, 592
   See application file for complete search history.

(56) References Cited

U.S. PATENT DOCUMENTS

| | | | |
|---|---|---|---|
| 6,341,899 B1 * | 1/2002 | Shirakawa et al. | 385/88 |
| 6,350,063 B1 * | 2/2002 | Gilliland et al. | 385/88 |
| 6,364,540 B2 * | 4/2002 | Shishikura et al. | 385/88 |
| 6,485,322 B1 * | 11/2002 | Branch et al. | 439/357 |
| 6,499,890 B2 * | 12/2002 | Gilliland et al. | 385/88 |
| 6,796,719 B2 * | 9/2004 | Zhu et al. | 385/76 |
| 6,942,395 B1 * | 9/2005 | Chuan et al. | 385/53 |
| 7,229,220 B2 * | 6/2007 | Zhu et al. | 385/92 |
| 7,534,140 B2 * | 5/2009 | Zheng et al. | 439/607.01 |
| 8,202,011 B2 * | 6/2012 | Moore | 385/88 |
| 2006/0234554 A1 * | 10/2006 | Tsai | 439/607 |
| 2010/0272404 A1 * | 10/2010 | He et al. | 385/94 |

* cited by examiner

*Primary Examiner* — Ellen Kim
(74) *Attorney, Agent, or Firm* — Chun-Ming Shih; HDLS IPR Services

(57) ABSTRACT

A universal modular connector includes a base and a transforming module. The base has a first opening thereon, and the base further has an optical component therein. The transforming module has a circuit board, a plurality of connection terminals, a first signal transforming integrated circuit (IC), and at least one fiber optic connector therein. The transforming module receives external electronic signal through the connection terminals, and transforms the received electronic signal into optical signal via the first signal transforming IC. The transforming module is connected with the base through the first opening, and the optical component of the base receives the transformed optical signal sent by the fiber optic connector of the transforming module. Therefore, the universal modular connector transmits the optical signal externally to an electronic device via the optical component.

9 Claims, 6 Drawing Sheets

UNIVERSAL MODULAR CONNECTOR

BACKGROUND OF THE INVENTION

1. Field of the Invention

The invention relates to connectors, in particularly to connectors for transmitting optical signals.

2. Description of Related Art

As the electronic industry growing rapidly, nowadays various kinds of electronic devices are used in our daily lives. For inputting commands to control the electronic devices, or transmitting information from one electronic device to another, at least one connector is arranged on a circuit board of the electronic device.

For example, a personal computer usually has a plurality of connectors such as universal serial bus (USB) connectors, external serial advance technology attachment (e-SATA) connectors, RJ-45 connectors, high definition multimedia interface (HDMI) connectors. With the connectors, the personal computer is capable of communicating with external controlling devices and receiving controlling commands, or the personal computer can be connected to another electronic device for mutually transmitting information.

Since the available area on the circuit board is limited and not enough for arranging all kinds of connectors thereon, a stacked connector assembly having multiple connectors arranged vertically with respect to the circuit board is provided. The stacked connector assembly occupies the same area as one conventional connector does and no additional space is further required, thus the number and the types of the connectors to be arranged on the circuit board can be increased.

However, when the manufacturing of the stacked connector assembly is completed, the selected connectors integrated therein can not be changed. When a different type connector that can not be coupled to any one port of the stacked connector assembly is occasionally used, there is still a need to further arrange an additionally corresponding connector on the circuit board.

Therefore, if there is a connector assembly for welding onto the circuit board that can be made for coupling with every kind of connectors and needs not to be detached from the circuit board while adapting a different connector, it will be more convenient for user to use.

SUMMARY OF THE INVENTION

The main objective of the present invention is to provide a universal modular connector, capable of transforming every kind of electric signals into optical signals and transmitting it out and every kind of transmitting interfaces can be integrated into the universal modular connector.

For achieving the above objective, the universal modular connector of the present invention includes a base and a transforming module. The base has a first opening thereon, and the base further has an optical component therein. The transforming module has a circuit board, a plurality of connection terminals, a first signal transforming integrated circuit (IC), and at least one fiber optic connector therein. The transforming module receives external electronic signal through the connection terminals, and transforms the received electronic signal into optical signal via the first signal transforming IC. The transforming module is connected with the base through the first opening, and the optical component of the base receives the transformed optical signal sent by the fiber optic connector of the transforming module. Therefore, the universal modular connector transmits the optical signal externally to an electronic device via the optical component.

The present invention provides the universal modular connector for transforming every kind of electronic signals into a same optical signal by replacing the transforming module of different types of transmission interface. User needs only to replace the corresponding transforming module to transmitting information data, thus needs not to detach any connector from the circuit board while adapting a different connector, it will improve convenience for user.

DETAILED DESCRIPTION OF THE INVENTION

A detailed description of the present invention will be made with reference to the accompanying drawings.

Figure 1:
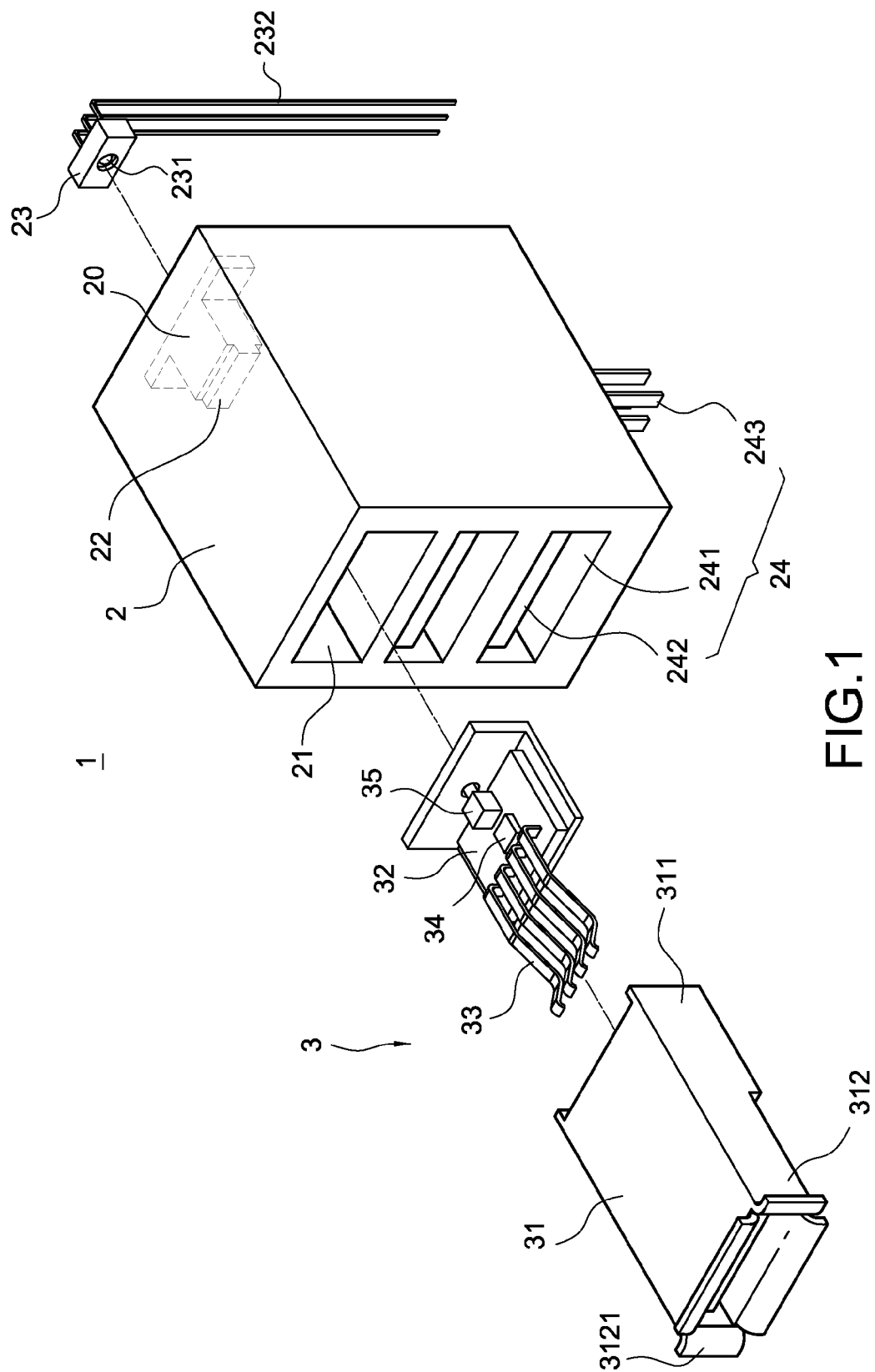
FIG. 1 is an exploded view of the first embodiment of the present invention.
Figure 2:
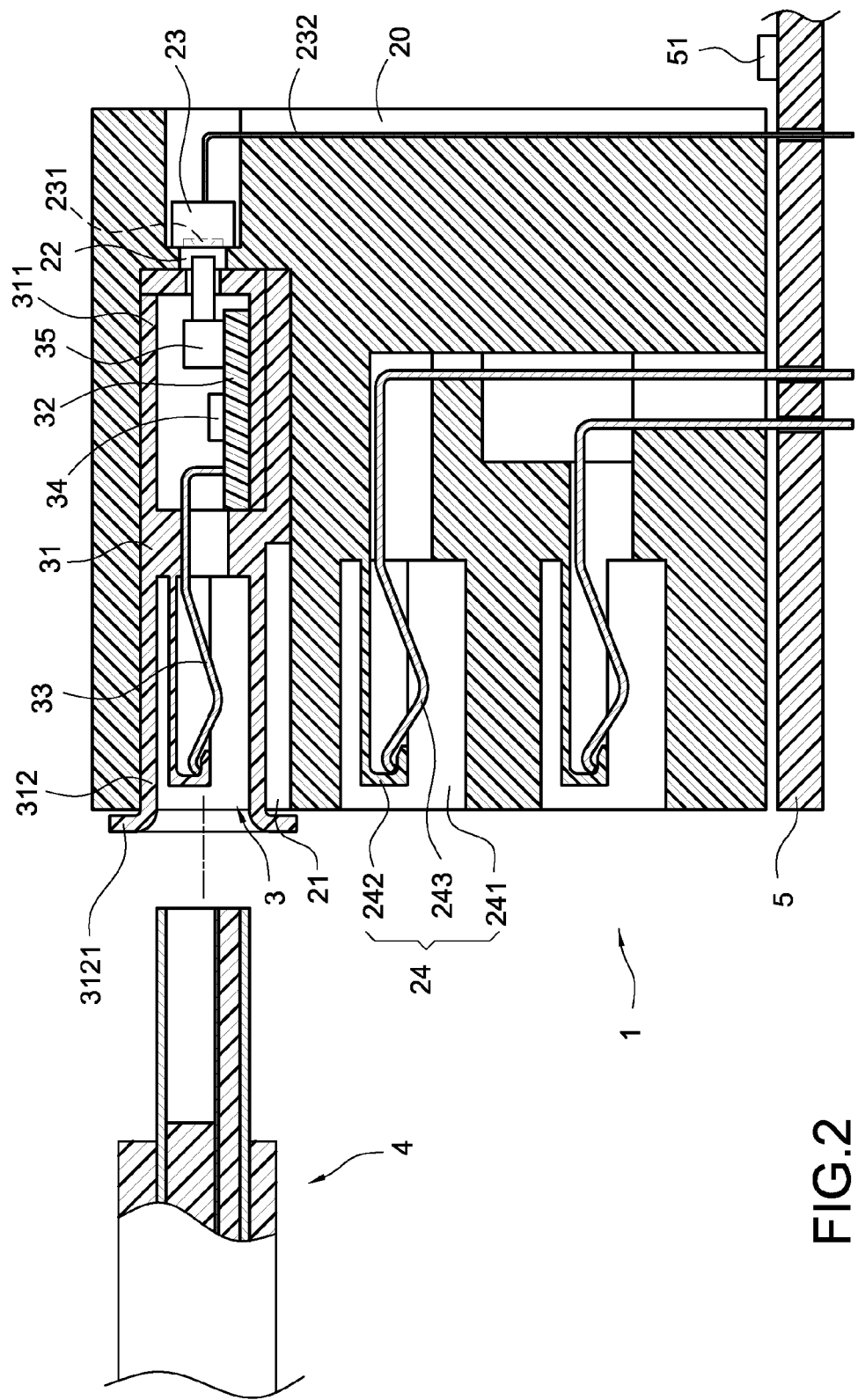
FIG. 2 is cross sectional view of the first embodiment of the present invention.

FIG. 1 is an exploded view showing a universal modular connector 1 according to an embodiment of the present invention. The universal modular connector 1 mainly includes a base 2 and a transforming module 3. The base 2 is electrically connected to a motherboard 5 (as shown in FIG. 2) of an external electronic device (not shown). The transforming module 3 is used for electrically connected to an external transmission line 4 (as shown in FIG. 2), and receiving a specific format electronic signal and transforming the electronic signal into a optical signal, and then transmitting the optical signal to the base 2. Then, the signal is transmitted from the base 2 to the motherboard 5. And a second signal transforming integrated circuit 51 on the motherboard 5 can transform the optical signal into an electronic signal for further use.

The base 2 has a first opening 21 at a front end surface thereof. The shape of the first opening 21 is a universal type. The base 2 defines a receiving space 20 therein. The base 2 has an optical component 23 arranged in the receiving space 20. The optical component 23 has an optical receiving portion 231 and a welding terminal 232. The optical receiving portion 231 is located corresponding to the first opening 21 for receiving external optical signal. The welding terminal 232 downwardly extends from the optical receiving portion 231 and protrudes out from the base 2. The connector 1 is electrically connected to the motherboard 5 through the welding terminal 232.

The transforming module 3 mainly has a circuit board 32, a plurality of connection terminals 33, a first signal transforming integrated circuit 34, and an optical fiber connector 35. The transforming module 3 further includes a shell 31 surrounding the circuit board 32, the connection terminals 33, the first signal transforming integrated circuit 34, and the optical fiber connector 35. It should be mentioned that the locations and the number of the optical component 23 are in correspondence with the optical fiber connector 35. And the number is one or more.

The connection terminals 33 are electrically connected with the transmission line 4 for receiving an external electronic signal. The first signal transforming integrated circuit 34 is used for transforming the electronic signal received by the connection terminals 33 into an optical signal. The optical fiber connector 35 is used for outwardly transmitting the optical signal transformed by the first signal transforming integrated circuit 34.

FIG. 2 is cross sectional view of the universal modular connector 1 according to an embodiment of the present invention. The shell 31 has a connecting end 312 and an adapting end 311 away from the connecting end 312. The shape of the adapting end 311 coincides with the shape of the first opening 21. The adapting end 312 of the shell 31 is inserted into the first opening 21 and the transforming module 3 is located in the first opening 21. The optical fiber connector 35 is located corresponding to the optical receiving portion 231 of the optical component 23. It should be mentioned that the connecting end 312 has at least one bended portion 3121 away from the adapting end 311. The bended portion 3121 protrudes out from the base 2 when the transforming module 3 is inserted into the first opening 21. Thus, user can pull out the transforming module 3 from the first opening 21 by holding the bended portion 3121.

The base 2 has a tunnel 22 communicating the receiving space 20 and the first opening 21. The optical receiving portion 231 is located corresponding to the tunnel 22, and the optical receiving portion 231 receives the optical signal transmitted from the optical fiber connector 35 of the transforming module 3 through the tunnel 22.

The transforming module 3 is capable of connecting with transmission line 4 of every kind of transmission interface. The electronic signal is transformed into optical signal by the transforming module 3 and then the optical signal is transmitted by the base 2 to motherboard 5. Therefore, the format of the transforming module 3 is correspondent to the transmission line 4 so as to connect with it.

For example, the transmission line 4 shown in FIG. 2 is a universal serial bus (USB) format transmission line 4. In this embodiment, the shape of the connecting end 312 coincides with the shape of a USB connector, and the number of the connection terminals 33 is four. The connection terminals 33 are electrically connected to the USB transmission line 4 for receiving a USB format electronic signal.

In this embodiment, the transforming module 3 is connected with the transmission line 4 through the connecting end 312 for electronic signal transmission. And the adapting end 311 of the transmission module 3 is inserted into the first opening 21 for optical signal transmission. Therefore, even there is no connector corresponding to the transmission line 4 on the motherboard 5, the universal modular connector 1 is capable of being connected with the transmission line 4 for receiving signal.

It should be mentioned that at least one connector 24 can be arranged under the first opening 21. Consequently, the universal modular connector 1 is a stacked connector assembly that can transmit optical signal as well as electronic signal.

More specifically, the base 2 further has at least one second opening 241 under the first opening 21. The second opening 241 has a tongue portion 242 and a plurality of connection terminals 243 arranged on the tongue portion 242. The second opening 241 and the tongue portion 242 and the connection terminals 243 constitute an electrical connector 24. One ends of the connection terminals 243 protrude out from the base 2 and electrically connects to a motherboard 5. The number of the connectors 24 can be plural. The number of the connectors 24 are two, but not limited thereto, in the embodiments in FIG. 1 and FIG. 2.

In this embodiment, the format of the connector 24 is a USN connector for example. In practical use the connector 24 can be replaced by external serial advance technology attachment (eSATA) connector, high definition multimedia interface (HDMI) or other type connectors.

Figure 3:
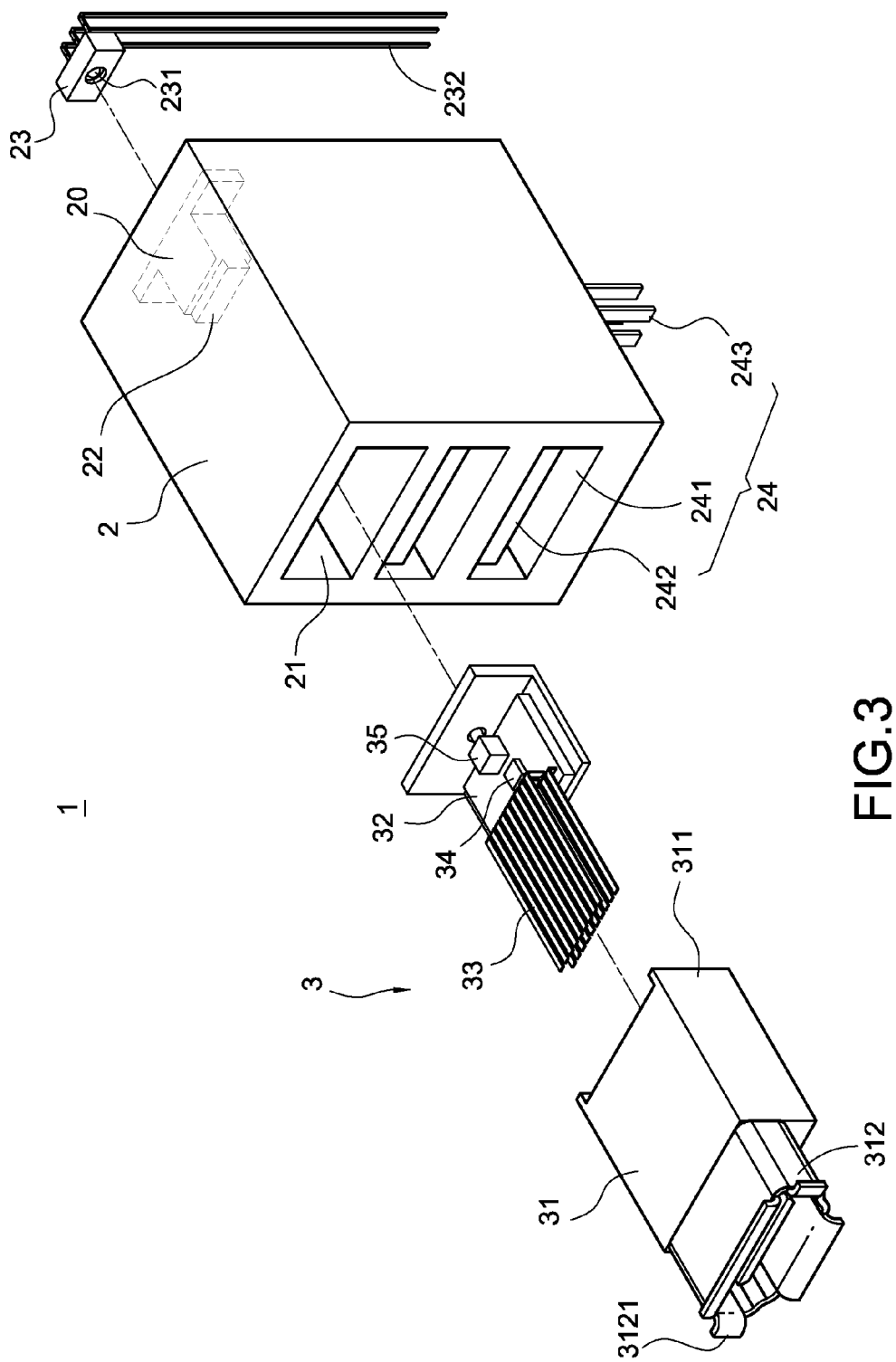
FIG. 3 is an exploded view of the second embodiment of the present invention.
Figure 4:
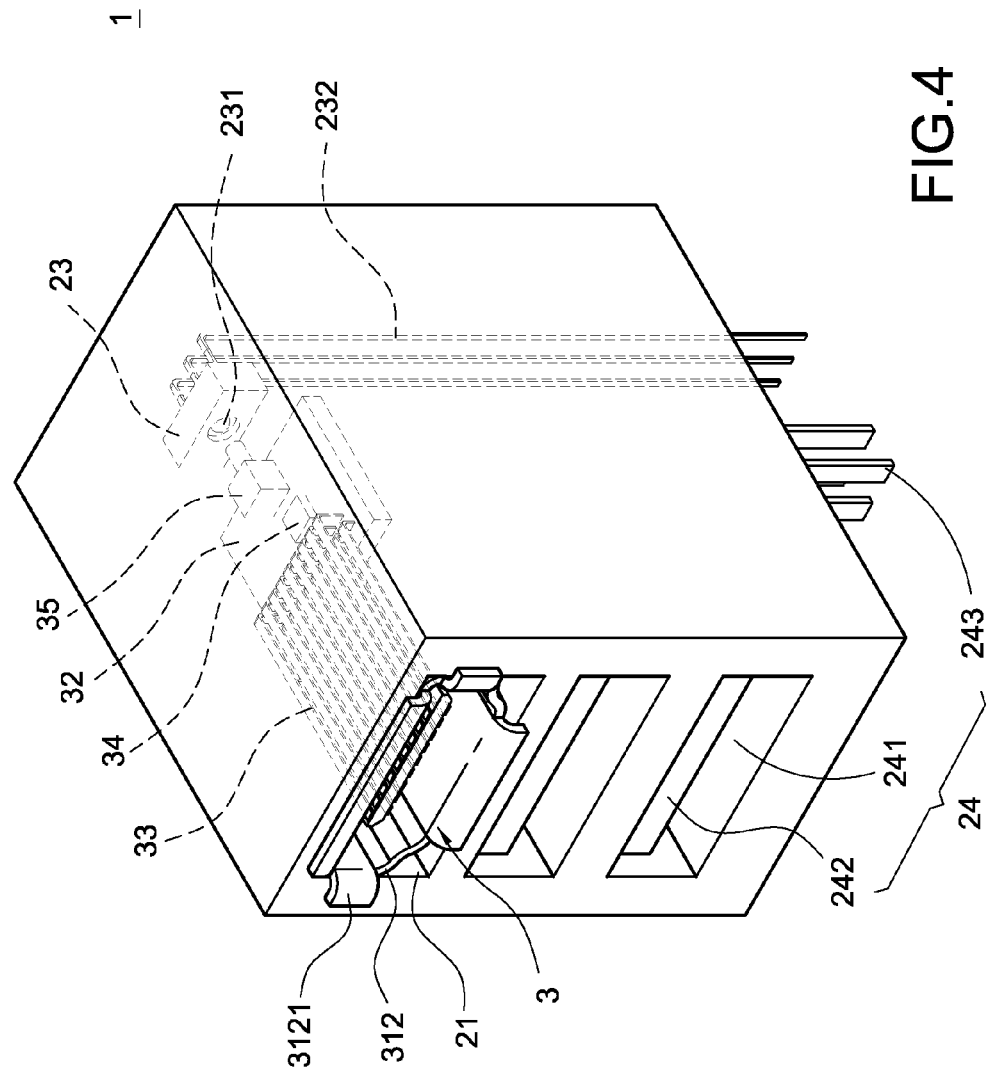
FIG. 4 is a perspective view of the second embodiment of the present invention.

FIG. 3 and FIG. 4 show the universal modular connector 1 according to the second embodiment of the present invention. The shape of the connecting end 312 of the shell 31 coincides with the shape of a high definition multimedia interface (HDMI) connector. The number of the connection terminals 33 is nineteen3. The adapting end 311 of the transforming module 3 is inserted into the first opening 21 and the connecting end 312 can be used for connecting to an external HDMI transmission line for receiving an HDMI format electronic signal through the connection terminals 33.

Figure 5:
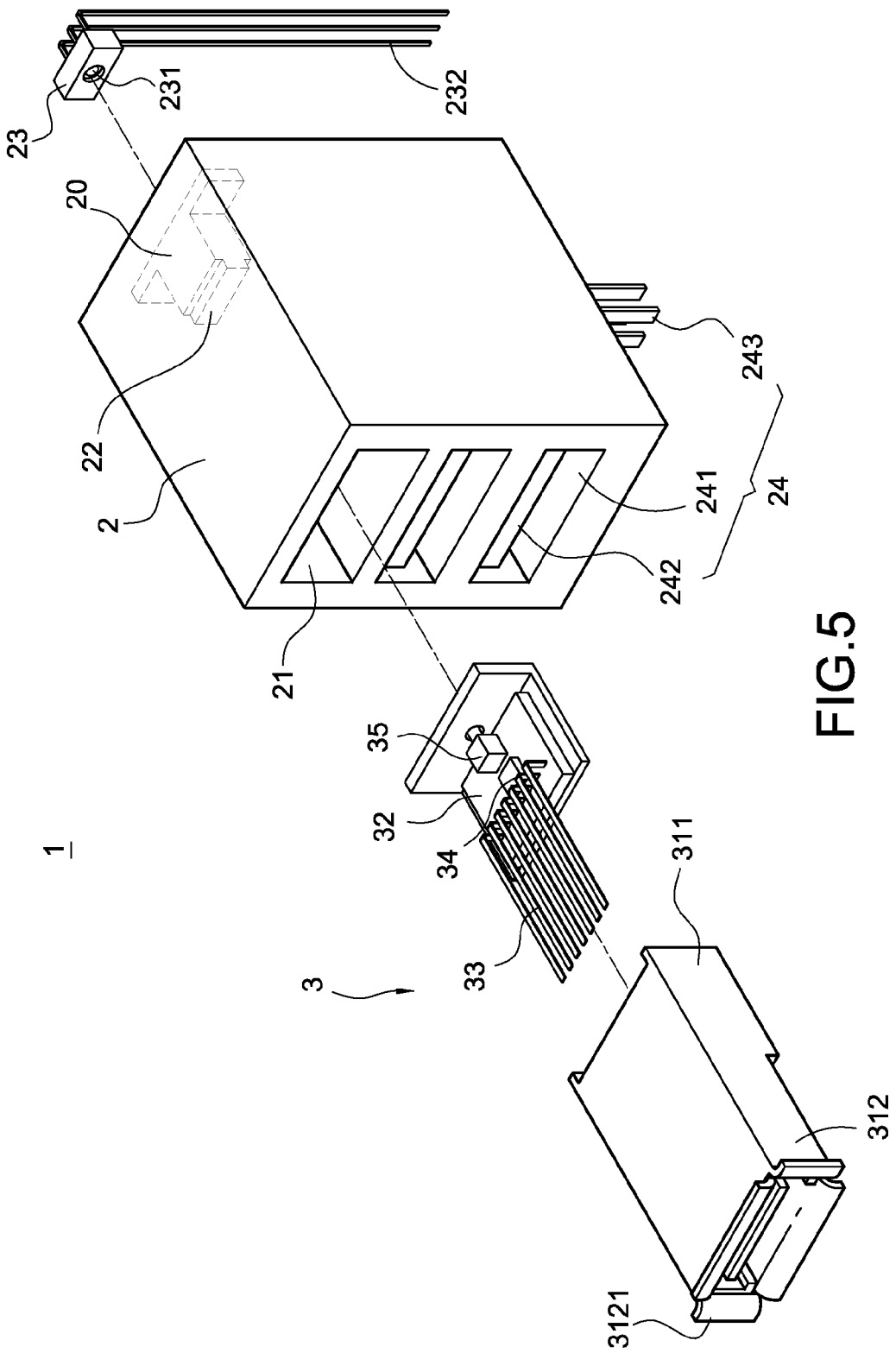
FIG. 5 is an exploded view of the third embodiment of the present invention.
Figure 6:
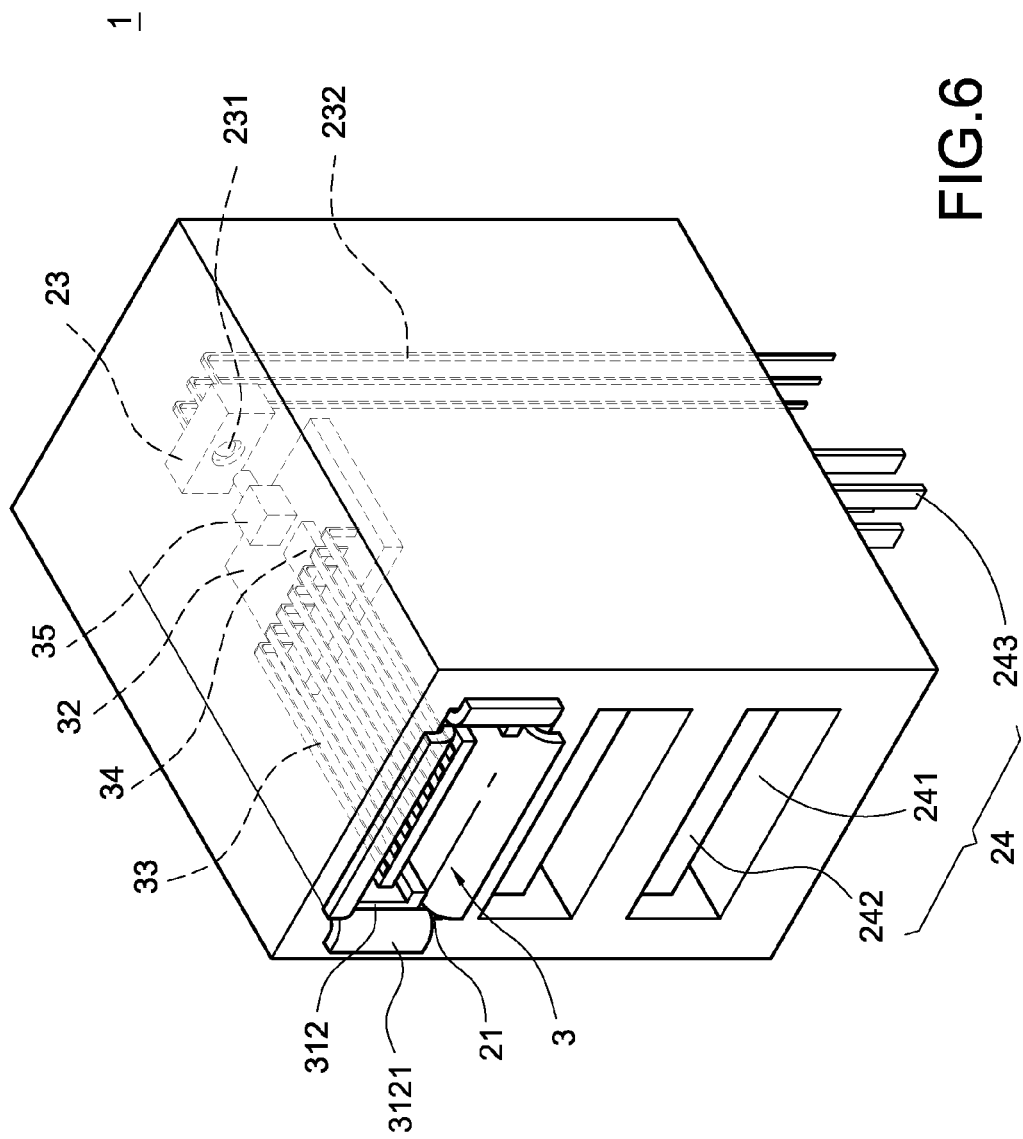
FIG. 6 is a perspective view of the third embodiment of the present invention.

FIG. 5 and FIG. 6 show the universal modular connector 1 according to the third embodiment of the present invention. The shape of the connecting end 312 coincides with the shape of an external serial advance technology attachment (eSATA) connector. The number of the connection terminals 33 thereof is seven. The adapting end 311 of the transforming module 3 is inserted into the first opening 21 and the connecting end 312 can be used for connecting to an external eSATA transmission line for receiving an eSATA format electronic signal through the connection terminals 33.

However, the universal modular connector 1 can be connected to the transmission line of every kind of transmission interface and receive every kind of electronic signal to transform. In practical use, the transmission module 3 can be adapted to every kind of transmission interface such as J-45、USB3.0、SPDIF, and not limited thereto.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A universal modular connector comprising:
   a base having a first port with a first opening formed at a front side of the base, and defining an receiving space at a back side of the base opposite to the front side, the base further having an optical component arranged in the receiving space, the optical component having an optical receiving portion for receiving an optical signal, and a welding terminal extending from the optical receiving portion and protruding out of the base to electrically connect to a motherboard of an electronic device, wherein a tunnel is formed inside the base to communicate between the first port and the receiving space, and the optical receiving portion is located corresponding to the tunnel at one side to receive the optical signal; and
   a transforming module pluggably inserted into the first port of the base and having a circuit board, a plurality of connection terminals, a first signal transforming integrated circuit, and an optical fiber connector located corresponding to the tunnel at the other side, wherein the connection terminals are electrically connected to the circuit board and extending towards the first opening for receiving an electronic signal from an external transmission line with a connector engaging with the transforming module, the first signal transforming integrated circuit is electrically connected to the circuit board for transforming the electronic signal received by the connection terminals to the optical signal, and the optical fiber connector transmits the optical signal transformed by the first signal transforming integrated circuit via the tunnel to the optical receiving portion of the optical component, thereby, the universal modular connector is capable of transforming different electronic signals into the same optical signal by replacing the transforming module in different types of transmission interfaces.

2. The universal modular connector as claim 1, wherein the transforming module further comprises a shell surrounding the circuit board, the connection terminals, the first signal transforming integrated circuit, and the optical fiber connector.

3. The universal modular connector as claim 2, wherein the shell has a connecting end and an adapting end at two ends, respectively, and the shape of the adapting end coincides with the shape of the first opening to have the shell insert into the first port.

4. The universal modular connector as claim 3, wherein the connecting end has at least one bended portion protruding out of the base from the first opening after the shell together with the transforming module are inserted into the first port, so that a user can pull out the transforming module from the first port by holding the bended portion.

5. The universal modular connector as claim 3, wherein the shape of the connecting end coincides with the shape of a universal serial bus (USB) connector, the number of the connection terminals is four, and the connection terminals are electrically connected to an external USB transmission line for receiving a USB format electronic signal.

6. The universal modular connector as claim 3, wherein the shape of the connecting end coincides with the shape of an external serial advance technology attachment (eSATA) connector, the number of the connection terminals is seven, and the connection terminals are electrically connected to an external eSATA transmission line for receiving an eSATA format electronic signal.

7. The universal modular connector as claim 3, wherein the shape of the connecting end coincides with the shape of a high definition multimedia interface (HDMI) connector, the number of the connection terminals is nineteen, and the connection terminals are electrically connected to an external HDMI transmission line for receiving an HDMI format electronic signal.

8. The universal modular connector as claim 1, wherein the base further has at least one second port with a second opening under the first opening, the second port has a tongue portion and a plurality of connection terminals arranged on the tongue portion, one ends of the connection terminals protruded out from the base and electrically connects to the motherboard, and the second opening and the tongue portion and the connection terminals constitute an electrical connector.

9. The universal modular connector as claim 8, wherein the electrical connector is a USB connector, an eSATA connector, or a HDMI connector.

* * * * *